United States Patent Office 3,425,088
Patented Feb. 4, 1969

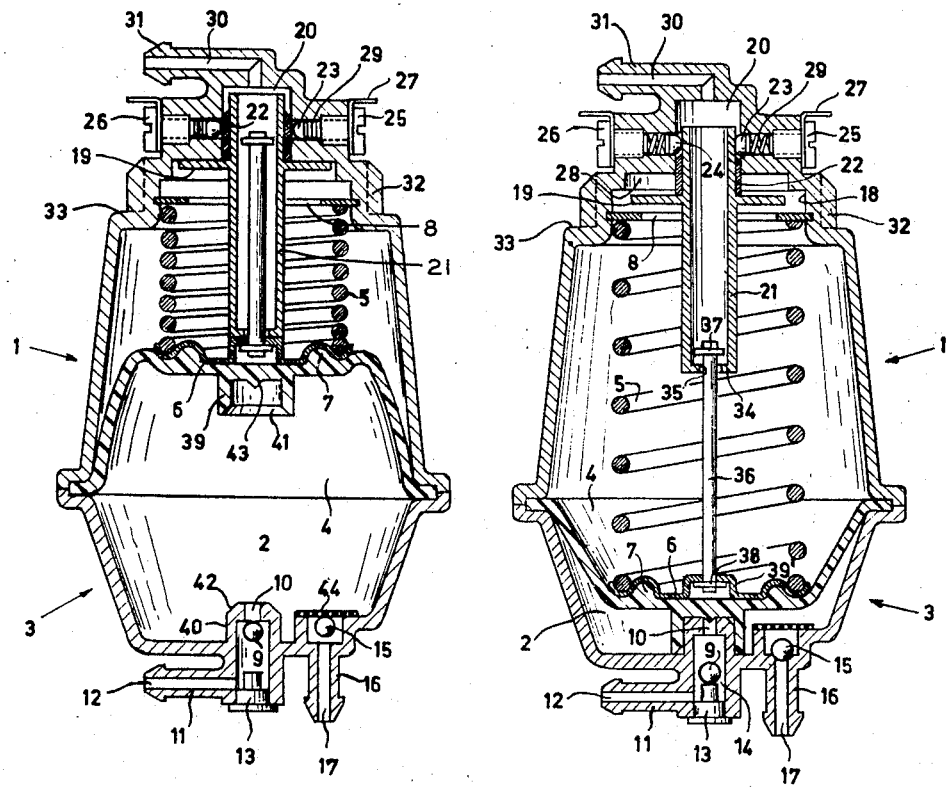

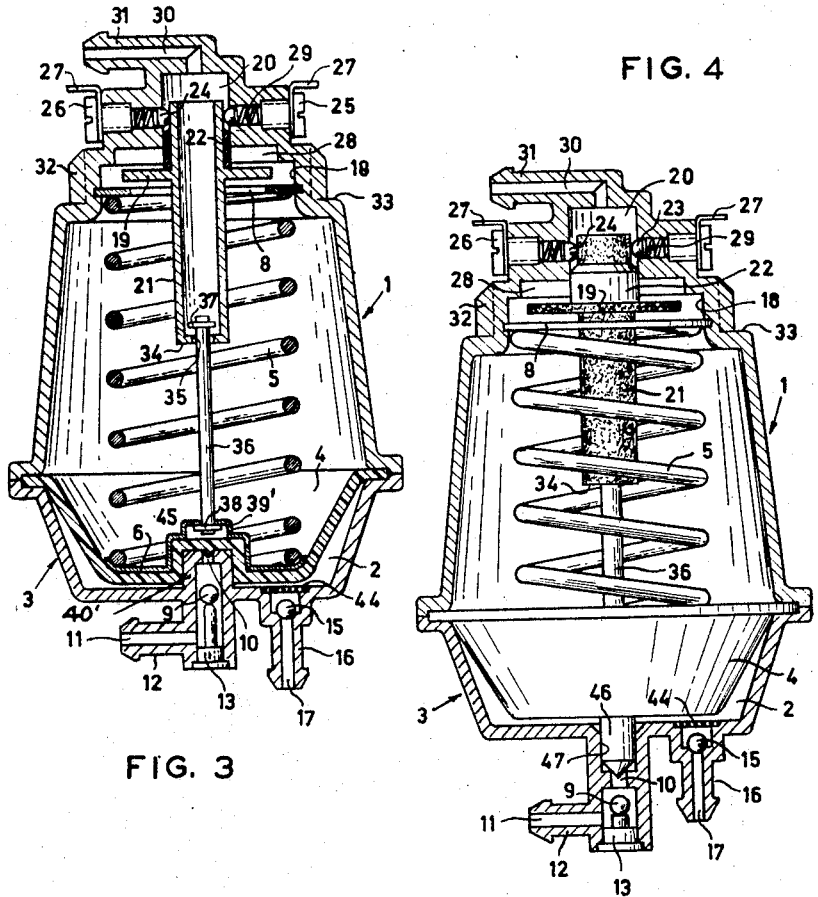

3,425,088
RECIPROCATING PUMPS FOR USE WITH WINDSHIELD WASHERS
Henri Charles Molenaar, Stevinstraat 177,
The Hague, Netherlands
Filed May 1, 1967, Ser. No. 635,073
Claims priority, application Netherlands, May 2, 1966,
6605887
U.S. Cl. 15—250.02                6 Claims
Int. Cl. A47l 1/02; B60s 1/02; F15b 15/22

ABSTRACT OF THE DISCLOSURE

This invention relates to a reciprocating pump for use in a windshield washing system for automobiles having an electrically driven windshield wiper, the pump including a pumping member movable in a pumping chamber for drawing liquid into the chamber from a source of washing fluid and for discharging liquid from the pumping chamber through one or more nozzles against the windshield of the automobile and means responsive to movement of the pumping member as it approaches the end of its discharge stroke for restricting discharge of liquid from the pumping chamber to decrease the speed of the pumping member and allow the windshield wiper to continue to operate for a period of time after discharge of the washing fluid is discontinued, the pump further being provided with valves for keeping the pipes leading from the source of washing fluid to the washer nozzles full of the washing liquid.

---

This invention relates to improvements in windshield washing systems, and more particularly to improvements in pumps for supplying liquid to the nozzles of a windshield washer and for controlling the operation of the electric motor for operating the windshield wipers.

Windshield washing systems of many different types have been provided heretofore for use in conjunction with single or variable speed electrically driven windshield wipers to enable the washing fluid to be sprayed on the windshield and to start the wiper motor during spraying of the liquid and continue the operation of the motor after discharge or spraying of the washing liquid has stopped. Some of these systems require the windshield wiper motor to be shut off manually after the windshield washing operation is completed while others automatically discontinue the operation of the windshield wiper a short time after spraying of the windshield washing liquid has stopped.

A disadvantage of the prior systems is that the pumping system provided for spraying the washing liquid on the windshield is not immediately effective upon initiation of the windshield washing operation to spray the liquid against the windshield, particularly when the washer has not been used recently. The reason for this is that the liquid in the system tends to drain back from the nozzles, pump, and the connecting pipes or tubes into the receptacle for the washing liquid and must be refilled by operation of the pump before any liquid in sprayed against the windshield. This occurs usually because the valves of the system leak unintentionally or because they are designed to leak and retard the movement of the pumping member in the last stage of its discharge movement to prolong the operation of the windshield wipers after discharge has ceased or substantially ceased. The retarding effect is usually provided by leakage in the intake valve of the pump.

In accordance with the present invention, a pump is provided which includes a pumping member movable in a pumping chamber to draw liquid into the chamber from a receptacle for the washing liquid in one direction of movement and discharge liquid in the opposite direction, the pumping member being associated with switching means which energizes the windshield wiper motor during the intake stroke and through a lost motion connection continues the operation of the windshield wiper motor during the major portion of the discharge stroke, the last stage of the discharge stroke being slowed by means of a slide valve mechanism which progressively closes the discharge port and a leak port in the intake valve which permits a slow leakage of liquid from the pumping chamber as the outlet port closes completely and seals the liquid in the pipes or tubes leading from the washing fluid receptacle to the spray nozzles of the system.

More particularly, in accordance with the present invention, the valve closes the outlet port includes cooperating slide valve members which engage during the latter stage of movement of the pumping member in a discharge direction and thereby at least partially close the discharge port in one of the slide valve members and finally completely close and seal the discharge port by engagement therein of a valve plug carried by one of the slide valve members. In this way, liquid is trapped in the pump and the pipes or tubes of the windshield washing system so that the windshield washer is ready for immediate discharge of washing fluid against the windshield of the automobile even though it has not been used for a prolonged period of time, and further enabling the discharge of a larger amount of liquid against the windshield for a given pump capacity.

Windshield washer pumps of the type described can be used with any type of electrically driven windshield wiper of the single speed, multi-speed or variable speed types, and with or without the usual control means for parking the windshield wiper blades after use.

For a better understanding of the present invention, reference may be had to the accompanying drawings, in which FIGURE 1 is a view in an axial section of a pump embodying the invention, with the pumping member shown at the end of a suction stroke;

FIGURE 2 is a view in an axial section of the pump of FIGURE 1, showing the pumping member at the end of a discharge stroke;

FIGURE 3 is a view in an axial section of another form of a pump embodying the invention; and FIGURE 4 is a partial sectional view of another modification of the pump embodying the invention.

In all embodiments shown corresponding parts are indicated by the same reference numerals. As appears from the drawings and will be described hereunder, the various embodiments shown only differ in that the means for effecting a restricted discharge of liquid as the pumping member approaches the end of its discharge stroke are differently constructed.

Each of the embodiments of the pump shown in the drawings and described hereinafter is intended to be interconnected with the battery and the driving motor of the windshield wiper of an automobile.

In all embodiments shown the pumping member of the pump includes a rubber diaphragm 4 clamped around its edge between the opposing edges of the sections 1 and 3 of the pump housing. Section 1 of the housing contains the control means for closing and for opening an electric circuit of an electric windshield wiper driving motor. Section 3 of the pump housing comprises the pumping chamber 2. Section 1 of the pump housing is preferably formed of an electrically insulating material, such as synthetic plastic or the like.

While it is entirely possible to arrange each of the embodiments of the pump shown so that the diaphragm 4 may be moved manually to exert a suction stroke, e.g., by means of an actuating rod secured to the central part of the diaphragm and provided at its end extending outside the pump housing with a pull knob, the embodiments shown are arranged so that the diaphragm 4 is moved by means of vacuum developed in the space between the housing section 1 and the diaphragm 4 to draw liquid into the pumping chamber 2 as described hereinafter. During a suction stroke of the diaphragm, a spring 5 accommodated in the pump housing section 1 is compressed and affects the subsequent discharge stroke of the diaphragm when the vacuum is relieved.

Referring to FIGURES 1 and 2, one end of spring 5 bears against a disc 6 provided with a circumferential groove cooperating with a corresponding bead 7 on the diaphragm 4 for centering the disc 6. The other end of spring 5 bears against a locking ring 8 accommodated in a groove in the inner walls of housing section 1. Locking ring 8 also serves to prevent the spring 5 from pulling the control means described hereinafter out of the bore in which it is mounted during assembling of the pump.

In the embodiments shown the control means for closing and opening an electric circuit of the driving motor includes a tube-shaped part 21 formed of an electrically insulating material and is slidably mounted in the bore 20, the axis of which is aligned with the axis of the diaphragm 4. Part 21 of the control means carries a flange 19 which can be received in a chamber 28 in the housing section 1. Further, the part 21 means carries a contact ring 22 formed of electrically conducting material and provided with a bevelled edge, which contact ring can establish an electric connection between two contact balls 23 and 24 positioned diametrically opposite each other in radial bores in the pump housing section 1. Dependent on the position of the control means 21, the balls 23, 24 are urged against the insulating part 21 of the control means or against the contact ring 22 by means of springs 29. In their turn, springs 29 are tensioned by means of screws 25 and 26 screwed in radial bores in the pump housing section 1, each of which screws carries a soldering lip 27 for a lead or conductor (not shown).

A duct 30 opens into bore 20 in the pump housing, the bore 20 being connected to the connecting nipple 31 by means of a pipe or conduit (not shown) and a suitable manually controlled valve (not shown) mounted in the instrument panel of an automobile to enable the duct 30 to be connected at will to the inlet manifold of the automobile engine, or with the ambient atmosphere. When duct 30 is connected with the inlet manifold, the vacuum or reduced pressure in the manifold together with the pressure of the atmosphere on the washing fluid moves the diaphragm 4 so that a projecting portion 39' of disc 6 will abut against the end face 34 of part 21 of the control means. As a result of this action, the part 21 means is moved into the position shown in FIGURE 1 in which position the contact ring 22 has closed an electric circuit for activating the driving motor of the windshield wiper. The end of a suction stroke of the diaphragm has been completed when flange 19 of the control means abuts against the bottom of chamber 28 of the pump housing. As soon as the windshield wipers start to operate, the duct 30 is connected to the ambient atmosphere by means of the operating device mentioned enabling the spring 5 to expand and squirt washing liquid onto the windshield of the automobile.

Diaphragm 4 of the embodiment shown in FIGURES 1 and 2 has at its side facing the pumping chamber 2 a hollow cylinder 39 forming part of the diaphragm. On the other hand, section 3 of the pump housing constituting pumping chamber 2 carries a projection 40 the axis of which coincides with the axis of the hollow cylinder 39. The outlet port 10 of the pumping chamber leading to the washer nozzles (not shown), is located at the tip of projection 40. As diaphragm 4 approaches the end of a discharge stroke, the hollow cylinder 39 and the projection 40 engage in the manner of a slide valve, during which action the hollow cylinder 39 progressively covers the projection 40. At the moment that the parts 39 and 40 engage, squirting of liquid onto the windshield of the automobile is abruptly terminated. Covering of projection 40 by the hollow cylinder 39 is facilitated because the open end of cylinder 39 has a bevelled guiding surface 41 which cooperates with a bevelled guiding surface 42 on the projection 40. When the outlet port 10 of the pumping chamber has been closed or has been substantially closed by the engagement of parts 39 and 40, diaphragm 4 can complete its discharge stroke at a greatly decreased speed because the pump is arranged so that a restricted discharge of liquid from the pumping chamber occurs. This restricted discharge of liquid can, e.g., be obtained by preventing the inlet ball valve 15 from seating tightly on its seat so that a narrow discharge passage is left for the liquid during the discharge stroke of the pumping member. The narrow passage can be constituted by a narrow groove (not shown) arranged in the seat of inlet ball valve 15.

Between the disc 6 and the part 21 of the control means extends a rod 36, one end of which is secured in the projecting portion 39' of disc 6 by means of a snap-on locking ring 38. The other end of the rod 36 extends through an opening 35 in bottom 34 of part 21 of the control means into the interior space of the tubelike part of the control means. The latter end of rod 36 carries a snap-on locking ring 37 slidable in the interior space of part 21 so that the rod 36 forms a lost motion connection between diaphragm 4 and the part 21. The distance between the locking rings 37 and 38 is such that as diaphragm 4 executes a discharge stroke, the snap-on locking ring 37 will engage the inner side of bottom 34 and begin to move the control means from the position shown in FIGURE 1 when the hollow cylinder 39 and the projection 40 first engage and discharge of liquid from the pumping chamber through outlet port 10 has ceased. When the pump, consequently, has ceased to squirt washing liquid onto the windshield, the diaphragm 4 completes its discharge stroke at a greatly reduced speed owing to the fact that only a narrow passage for discharge of liquid is still present. During this slow movement of the diaphragm 4, the driving motor of the wiper is kept in operation until the control means have been moved by rod 36 into a position in which the contact balls 23, 24 are in register with the circumferential line delimiting the cylindrical surface of the contact ring 22 from its bevelled edge. At this instant, the pressure exerted by the springs 29 will snap back the control means 21 into the position shown in FIGURE 2 thereby opening the electrical circuit of the wiper driving motor to arrest the wipers. Thereafter, diaphragm 4 completes its discharge stroke until the conical projection 43 at the bottom of the hollow cylinder 39 under the action of spring 5 positively closes the outlet port 10 (FIGURE 2) so that the liquid still present in the pipe line, leading from the outlet port 10 to the nozzles, in the pumping chamber 2 and in the suction pipe line leading to the inlet 17 cannot trickle back to receptacle (not shown) containing the washing liquid and the system is maintained full of liquid. Consequently, on actuation of the pump it discharges liquid immediately even when the pump has not been in operation for a long period of time.

In the embodiment shown in FIGURE 3 the means for effecting a restricted discharge of liquid from the pumping chamber 2 as the diaphragm 4 approaches the end of a discharge stroke are constituted by a recess 45 in the diaphragm which cooperates with a projection 40' corresponding to the projection 40 of the embodiment shown in FIGURES 1 and 2.

In the embodiment shown in FIGURE 4 the diaphragm 4' is provided with a projection 46 which cooperates with a recess 47 in the pump housing section 3, for effecting a restricted discharge of liquid from the pumping chamber 2 as the diaphragm approaches the end of a discharge stroke. In this embodiment the outlet port 10 of the pumping chamber 2 is located at the bottom of the recess 47.

The operation of the embodiments shown in FIGURES 3 and 4 is identical to the operation of the embodiment of the pump shown in FIGURES 1 and 2.

While it is possible to mount any of the above-described pumps at any desired location, it is preferred to mount the pump in the receptacle containing the washing liquid in such a way that the terminals 27 for the leads or conductors are outside of said receptacle. To this end, section 1 of the pump housing may be provided with a screw thread 32 to enable the pump to be screwed into an opening in a cover for the receptacle until the shoulder 33 bears against the inner face of said cover, which is detachably secured to the receptacle by means of threads, bayonet slots and pins or the like.

From the foregoing description of typical pumps embodying the invention, it will be understood that the pumps are susceptible of considerable modification. Accordingly, the embodiments of the invention described herein should be considered as illustrative and the invention only as described in the following claims.

I claim:
1. A reciprocating pump for a windshield washing system for automobiles having an electric windshield wiper comprising a housing having a pumping chamber therein, a pumping member movable in said housing for drawing liquid into and for discharging liquid from said pumping chamber, a spring for urging said pumping member in a direction to discharge liquid, means responsive to movement of said pumping member as it approaches the end of its discharging movement for restricting discharge of liquid from said pumping chamber, and control means in said pump housing remote from said pumping chamber for closing an electric circuit of said driving motor as said pumping member approaches the end of its liquid drawing movement and for opening said circuit during said restricted discharge of liquid from said pumping chamber, said means for restricting a discharge of liquid from said pumping chamber comprising a first slide valve member movable in unison with said pumping member and a second slide valve member opposing said first slide valve member carried by the pump housing, an outlet port for said pumping chamber in said second slide valve member, said first and said second slide valve members engaging telescopically to substantially close said outlet port as said pumping member approaches the end of a discharging movement.

2. A pump as set forth in claim 1, wherein said first slide member is a part of said pumping member and said second part is part of said pump housing, one of said parts being a recess and the other of said parts comprising a projection.

3. A pump as set forth in claim 1, wherein said first slide valve member is a recess in said pumping member and said second slide valve member projects from said pump housing coaxially with said recess and said outlet port.

4. A pump as set forth in claim 2, wherein said recess is a hollow cylinder.

5. A pump as set forth in claim 1, wherein said first slide valve member comprises a projection on said pumping member and said second slide valve member comprises a complemental recess in said housing having said port in the bottom thereof.

6. A pump as set forth in claim 1, wherein said first and said second slide valve members have cooperating bevelled guiding surfaces.

References Cited
UNITED STATES PATENTS

| 2,873,467 | 2/1959 | Oishei | 15—250.02 |
| 2,877,485 | 3/1959 | Oishei | 15—250.02 |
| 3,039,127 | 6/1962 | Molenaar | 15—250.02 |
| 3,040,712 | 6/1962 | Harrah | 91—394 |
| 3,097,608 | 7/1963 | Deibel et al. | 15—250.02 XR |

FOREIGN PATENTS 1,148,065  5/1963  Germany.

PETER FELDMAN, *Primary Examiner.*

U.S. Cl. X.R.
200—83; 91—394